United States Patent
Yu et al.

(10) Patent No.: US 12,088,512 B2
(45) Date of Patent: Sep. 10, 2024

(54) PACKET FRAGMENTATION USING OUTER HEADER

(71) Applicant: VMware LLC, Palo Alto, CA (US)

(72) Inventors: Jia Yu, Sunnyvale, CA (US); Yong Wang, San Jose, CA (US); Xinhua Hong, Campbell, CA (US); Wenyi Jiang, Palo Alto, CA (US); Guolin Yang, San Jose, CA (US); Dexiang Wang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/208,608

(22) Filed: Mar. 22, 2021

(65) Prior Publication Data
US 2022/0303231 A1 Sep. 22, 2022

(51) Int. Cl.
*H04L 49/9057* (2022.01)
*H04L 12/66* (2006.01)
*H04L 45/64* (2022.01)
*H04L 69/166* (2022.01)
*H04L 69/22* (2022.01)

(52) U.S. Cl.
CPC .......... *H04L 49/9057* (2013.01); *H04L 12/66* (2013.01); *H04L 45/64* (2013.01); *H04L 69/166* (2013.01); *H04L 69/22* (2013.01); *H04L 2212/00* (2013.01)

(58) Field of Classification Search
CPC ..... H04L 49/9057; H04L 12/66; H04L 45/64; H04L 69/166; H04L 69/22; H04L 2212/00
See application file for complete search history.

(56) References Cited

U.S. PATENT DOCUMENTS

| | | | |
|---|---|---|---|
| 2,003,834 A * | 6/1935 | Kearsley | A47B 25/00 108/90 |
| 8,428,087 B1 * | 4/2013 | Vincent | H04L 69/18 370/474 |
| 9,407,504 B1 * | 8/2016 | Di Benedetto | H04L 12/46 |
| 9,444,723 B1 * | 9/2016 | Di Benedetto | H04L 69/321 |
| 10,193,771 B2 * | 1/2019 | Koponen | H04L 43/026 |
| 10,630,610 B1 | 4/2020 | Wang et al. | |

(Continued)

OTHER PUBLICATIONS

J. Gross, et al., Geneve: Generic Network Virtualization Encapsulation https://tools.ietf.org/html/draft-ietf-nvo3-geneve-08#, Section-3.5 "Tunnel Options", Oct. 7, 2018.

(Continued)

*Primary Examiner* — Kibrom T Hailu
(74) *Attorney, Agent, or Firm* — King Intellectual Asset Management (57) ABSTRACT

In some embodiments, a method fragments a first packet into a plurality of fragments when a length of an encapsulated first packet is larger than a maximum transmission unit size. For each fragment in the plurality of fragments, fragmentation information is generated. The method encapsulates each fragment in the plurality of fragments with an outer header to form a plurality of encapsulated packets. The respective fragmentation information for each fragment is inserted in a portion of the outer header that is processed by endpoints of an overlay tunnel and not processed by a device along a path of the overlay tunnel. The plurality of encapsulated packets are sent via the overlay tunnel.

21 Claims, 7 Drawing Sheets

(56) References Cited

U.S. PATENT DOCUMENTS

| | | | | |
|---|---|---|---|---|
| 10,880,121 | B1* | 12/2020 | J | H04L 12/4633 |
| 2002/0131414 | A1* | 9/2002 | Hadzic | H04L 12/4633 |
| | | | | 370/393 |
| 2006/0050696 | A1* | 3/2006 | Shah | H04L 69/168 |
| | | | | 370/389 |
| 2017/0063783 | A1* | 3/2017 | Yong | H04L 69/22 |
| 2017/0324849 | A1* | 11/2017 | Pfister | H04L 61/2592 |
| 2018/0019891 | A1* | 1/2018 | Roever | H04L 12/2856 |
| 2019/0132296 | A1* | 5/2019 | Jiang | H04L 63/029 |
| 2019/0141010 | A1* | 5/2019 | Chander | H04L 61/2592 |
| 2020/0177503 | A1* | 6/2020 | Hooda | H04L 12/66 |

OTHER PUBLICATIONS

R. Bonica, et al., "IP Fragmentation Considered Fragile", https://tools.ietf.org/id/draft-ietf-intarea-frag-fragile-03.html, 15 pages, Nov. 21, 2018.

J. Gross, et al., "Geneve: Generic Network Virtualization Encapsulation", https://tools.ietf.org/html/draft-ietf-nvo3-geneve-08#, Section-4.1.1 "IP Fragmentation", Oct. 7, 2018.

Related U.S. Appl. No. 19/920,765, filed Jul. 6, 2020, 35 pages.

\* cited by examiner

PACKET FRAGMENTATION USING OUTER HEADER

BACKGROUND

In a software-defined networking environment, such as a software-defined data center (SDDC), compute nodes may communicate over logical overlay networks. Compute nodes may send packets for other compute nodes, which may be encapsulated with an outer header and sent over a physical network. In some cases, a size of the packet may be larger than a designated maximum transmission unit (MTU) size, which may require fragmentation of the packet. For example, a maximum transmission unit size of a tunnel endpoint may be larger than the maximum transmission unit size of a path in which the packet is sent. When a packet from a workload contains more data than the designated maximum transmission unit, the packet may be fragmented into smaller packets where each smaller packet includes a fragment of the original packet. The fragmented packets may be encapsulated with an outer header and sent via the path. Different techniques may be used to perform the fragmentation, but inefficiencies may result with existing methods.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In the accompanying drawings.

DETAILED DESCRIPTION

In the following description, for purposes of explanation, numerous examples and specific details are set forth to provide a thorough understanding of embodiments of the present disclosure. Some embodiments as expressed in the claims may include some or all the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

A system may support fragmentation of a packet where the encapsulated packet (or the packet) is larger than a designated maximum transmission unit size. The system may receive a packet and fragment the packet to form multiple inner packet fragments. The system then encapsulates the inner packet fragments with an outer header. Because fragmented packets are being sent to a receiver, the receiver requires information to reassemble the inner packet fragments.

Different conventional methods may be used to send the inner packet fragments that may result in inefficiencies. For example, outer fragmentation may be used where fragments of the original packet are encapsulated with an outer header. Outer fragmentation may use a defined process in a protocol to format the header of the encapsulated packets. For example, in the outer fragmentation process, the first encapsulated packet includes an outer header that may have a user datagram protocol (UDP) header. However, the second and later packets with other fragments do not have a UDP header. This may cause problems during transmission of the packets when services may be applied. A different outer header for the encapsulated packets may cause services to not be able to detect that the packets are for the same flow. For example, a 5-tuple hash that uses the information in the UDP header will not hash to the same result. In some cases, a service may not be able to detect bytes after the IP header are not real UDP headers in the second and later packets. The service may use the information after the IP header to compute the 5-tuple, which causes packets after the first packet to not be detected as being part of the same flow. When a service, such as receive side scaling (RSS) is used, a receive side scaling processor may dispatch the packets carrying the fragments to multiple receive queues because the packets are not identified as being associated with the same flow, which hurts the performance of processing the received packets. Also, devices in the path can detect that the encapsulated packet is carrying a fragment. For example, outer fragmentation sets a field that is designated for indicating outer fragmentation is being used. Some services in the path may need to reassemble the inner fragments to perform the respective service, such as to perform load balancing, network address translation, or firewall services. Instead of performing the reassembly, the devices may be configured to drop any fragmented packets when they detect outer fragmentation is being used.

In some cases, instead of using outer fragmentation, a method referred to as inner fragmentation may be used where the original packet is fragmented before encapsulation and then each fragment is encapsulated with an outer header. The encapsulated packets may look like regular encapsulated packets (e.g., not carrying fragmented packets). However, the inner fragmented packet may require an Internet protocol (IP) header (e.g., an inner header) that includes information that is used to reassemble the original packet. The inner packets all require an IP header that carries the fragmentation information and fragmentation of non-IP packets may not be supported.

To overcome the above problems, the system fragments the original packet into fragments. Then, the system encapsulates the fragments with an outer header. Instead of indicating the encapsulated packets include fragments in the field as discussed in the outer fragmentation process, the system inserts fragmentation information for the inner fragmented packet in a different portion of the outer header. For example, the system may insert fragmentation information in a portion of the header that is intended to be processed by tunnel endpoints. The devices in the path between the tunnel endpoints may not process the potion of the header and as such may not consider these packets as carrying fragments. Rather, tunnel endpoints may be configured to read the portion of the header to determine the encapsulated packets include fragments of an original packet.

The fragmentation information may identify the inner fragmented packet as a fragment of the original packet and identify the offset of the fragment in the original packet. The outer header may include the same information (e.g., source address, destination address, source port, and destination port) that can be used by services in the path to associate the encapsulated packets with the same flow. Also, the fragmentation may work for any type of packet whether the packet is an IP packet or not an IP packet. The fragmentation may be different from the above described inner fragmentation of an IP packet because the original packet may be treated as payload and is fragmented based on the designated maximum transmission unit size without having to add IP headers with fragmentation information to each fragmented packet. That is, a first fragment may include only a portion of the original packet, a next fragment may include a portion of the original packet, . . . , and the last fragment may include a last portion of the original packet. Also, the fragmentation may be different from the above described outer fragmentation because devices in the path do not treat the encapsulated packets as including fragments, and the encapsulated packets do not use follow the insertion of a UDP header in the first packet and the not in the subsequent packets.

To reassemble the above packet fragments, a receiver of the packet (e.g., tunnel endpoint) is configured to recognize the information in the outer header to determine that the inner packet is part of a fragmentation of an original packet. The receiver may store the inner fragments with information for the inner fragment, such as an identification for the original packet and the offset of the current inner fragment within the original packet. When all the inner fragments have been received for the original packet, the receiver may reassemble the original packet using the information for the inner fragments.

Overview

Figure 1A:
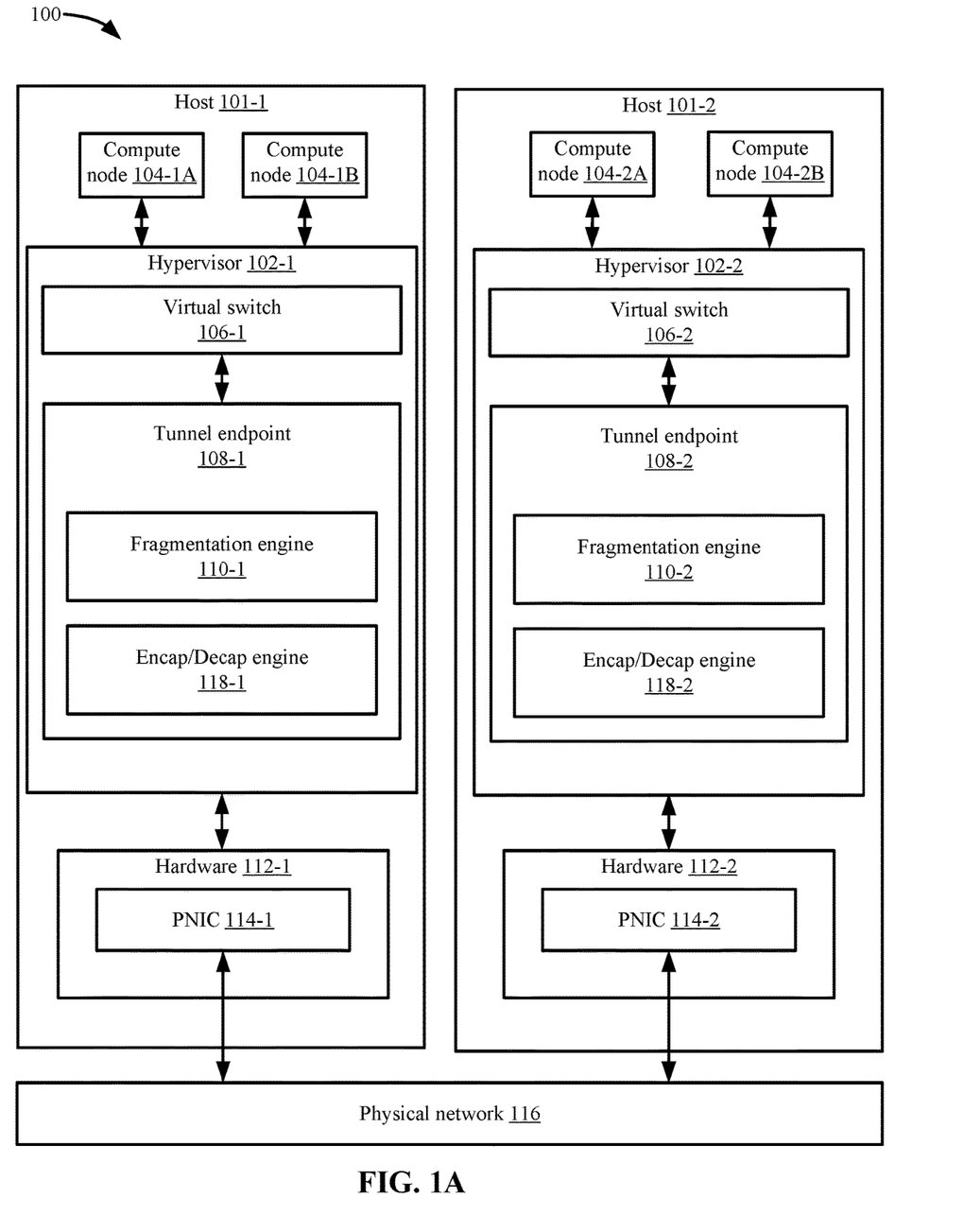
FIG. 1A depicts a system that includes a first host and a second host according to some embodiments.

FIG. 1A depicts a system 100 that includes a first host 101-1 and a second host 101-2 according to some embodiments. Host 101-1 includes compute nodes 104-1A to 104-1B that can communicate with compute nodes 104-2A to 104-2B in host 101-2.

Hosts 101-1 and 101-2 may include respective hardware 112-1 and hardware 112-2, and virtualization software (e.g., hypervisor 102-1 and hypervisor 102-2) to support various data compute nodes 104-1A and 104-1B, and 104-2A and 104-2B, respectively. Although two hosts 101-1 and 101-2 are shown, any number of hosts (also known as computing devices, host computers, host devices, host systems, physical servers, service systems, etc.) where each host may support any number of date compute nodes may be used in system 100. In some embodiments, hypervisors 102-1 and 102-2 provide software defined networking functionality to place compute nodes 104 on logical overlay networks as further described below. In other embodiments, the process of fragmenting the packets as described may be used with hypervisors that fragment packets without using overlay networks. Furthermore, instead of hypervisors, packet fragmentation may be implemented by an operating system's network stack or some other component in the data path of the network communication.

In some embodiments described below, compute nodes 104 may refer to virtual machines (VMs) that are running on a respective host, but this is one example of a virtualized computing instance or workload. Any suitable technology may be used to provide a workload, such as virtual machines, containers, etc. Although a virtualized environment is described, some embodiments may be used in an environment that is not virtualized. Also, the term "compute node" may refer to a host that is not virtualized. Also, although compute nodes 104 are shown as being part of hosts 101, compute nodes 104 may be separate physical devices from the components that perform the encapsulation and decapsulation. For instance, tunnel endpoint 108, fragmentation engine 110, and encapsulation/decapsulation engine 118 may be located in a separate physical device from compute node 104.

In some embodiments, compute nodes 104-1A/104-1B to 104-2A/104-2B belong to a software-defined logical overlay network implemented in system 100. Hypervisors 102-1 and 102-2 include a virtual switch 106-1 and a virtual switch 106-2, respectively, to handle traffic forwarding (e.g., packets) between compute nodes of host 101-1 and compute nodes of host 101-2. Virtual switches 106-1 and 106-2 implement software-defined network functionality by creating overlay networks on which compute nodes reside. Communication between compute nodes on different hosts is provided by way of a tunnel formed between tunnel endpoints 108-1 and 108-2 in which the packets are sent. A tunnel may generally refer to an end-to-end, bi-directional path between a pair of tunnel endpoints 108. The overlay network uses addresses of tunnel endpoints 108-1 and 108-2 to send encapsulated packets across intervening physical network 116. Tunnel endpoints 108-1 and 108-2 encapsulate packets with an outer header and decapsulate the packets to remove the outer header. The outer header identifies the addresses of tunnel endpoints 108-1 and 108-2, which the hypervisor uses to send the encapsulated packet through the tunnel.

Hypervisors 102-1 and 102-2 include virtual switches 106-1 and 106-2 and tunnel endpoints 108-1 and 108-2. Also, tunnel endpoints 108-1 and 108-2 include fragmentation engines 110-1 and 110-2, and encapsulation/decapsulation engines 118-1, respectively. These components may be part of an input/output chain in hypervisors 102-1 and 102-2 to process packets being sent to and from compute nodes 104. Although these components are depicted as being coupled together, it will be understood that some or all of the components may be separate software entities, or part of other components.

Tunnel endpoints 108-1 and 108-2 may be separate software entities from virtual switches 106-1 and 106-2, respectively, but can be thought of as an extension of the virtual switch (e.g., part of I/O chain between the virtual switch and a physical network interface (PNIC)) through which the host connects to physical network 116. However, tunnel endpoints 108-1 and 108-2 may be part of virtual switch 106-1 and virtual switch 106-2, respectively. Also, tunnel endpoints 108-1 and 108-2 may correspond to physical network interface cards (PNICs) 114-1 and 114-2, respectively. PNICs 114 are physical interfaces of hosts 101-1 and 101-2, respectively. Packets from compute nodes 104-1A and 104-1B are output through PNIC 114-1 onto physical network 116 and packets sent from compute nodes 104-2A and 104-2B are sent through PNIC 114-2 onto physical network 116. Physical network 116 may include any suitable number of interconnected network devices, such as layer 3 routers, layer 2 switches, gateway devices, etc. The term "layer 2" may refer generally to a media access control (MAC) layer, "layer 3" may refer to a network or internet protocol (IP) layer, and "layer 4" may refer to the transport layer in the open system interconnection (OSI) model, although the concepts described herein may use other networking models.

A logical overlay network may be formed using any suitable tunneling protocol, such as virtual extensible local area network (VXLAN), stateless transport tunneling (STT), generic network virtualization encapsulation (GENEVE), etc. System 100 may implement different configurations of logical networks. For instance, host 101-1 and host 101-2 may be situated in a single location, such as data center, or in different locations, such as in a cloud provider's data center and in an on premises data center.

A source compute node, such as compute node 104-1A, may send a large amount of data, referred to as an original packet, to a destination compute node, such as compute node 104-2A. The encapsulated original packet (or the original packet) may be larger than a designated maximum transmission unit size. The designated maximum transmission unit size may be determined in different ways. For example, the smallest value of a maximum transmission unit size that is discovered for a path through physical network 116 and the maximum transmission unit size for the interface of tunnel endpoint 108-1 may be used to determine the designated maximum transmission unit size. In one scenario, the maximum transmission unit size configured at tunnel endpoint 108-1 may be larger than a maximum transmission unit size in the path in physical network 116 between host 101-1 and host 101-2. Then, the maximum transmission unit size of the path may be used as the designated maximum transmission unit size. However, if the maximum transmission unit size of the tunnel endpoint interface is smaller, then the tunnel endpoint maximum transmission unit size is used as the designated maximum transmission unit size. Although the maximum transmission unit size for the path and tunnel endpoint 108 are described, other requirements for the maximum transmission unit size may be used. That is, the designated maximum transmission unit size may be configured based on different requirements.

When the expected encapsulated original packet size is larger than the designated maximum transmission unit size, the original packet should be fragmented into smaller packets. For example, a fragmentation engine 110-1 may fragment the original packet into a series of fragmented packets. Then, an encapsulation/decapsulation engine 118-1 may encapsulate each of the fragmented packets with an outer header. Through fragmentation, the original packet may be divided into smaller fragments to satisfy the designated maximum transmission unit size, such as the maximum transmission unit size for the path.

As will be discussed in more detail below, each flow may be uniquely identified by a set of header fields referred to as an N-tuple. For instance, each flow can be identified by a 5-tuple that includes the layer 3 source and destination addresses (e.g., IP source and IP destination addresses), the layer 4 source and destination ports (e.g., TCP or UDP source and destination ports), and the layer 4 protocol used (e.g., TCP or UDP). Physical network 116 transfers the encapsulated packets based on the IP source and IP destination addresses in the outer header. Any services that are performed by devices in physical network 116 may consider all the encapsulated packets as being from the same flow when the values found in an N-tuple are the same. Also, services at the receive side, such as receive side scaling that may be implemented by PNIC 114-2, consider all the encapsulated packets to be part of the same flow when the values found in an N-tuple are the same, and can perform services for the packets, such as by assigning all of the encapsulated packets to the same receive queue.

When generating the packets, encapsulation/decapsulation engine 118-1 may insert the same values that are found N-tuple for all fragmented packets. For example, encapsulation/decapsulation engine 118-1 fragments the original packet and then computes the same values for all outer headers that are used to send the fragmented packets. In some embodiments, the outer source IP address, outer destination IP address, and the outer destination port are the same. Encapsulation/decapsulation engine 118-1 calculates the outer source port based on the same information from the inner header, such as a tuple of information, which may include the inner source IP address, the inner source port, the inner destination IP address, and the inner destination port (and also the next layer protocol).

As will discussed in more detail, host 101-1 may add information for the fragmentation in the outer header of the encapsulated packets to allow identification of a fragmented packet and reassembly of the original packet. The information may include information indicating that more fragments may be received and information to allow reassembly of the original packet from multiple fragments, such as an offset for each respective fragment in the original packet. In some embodiments, the fragmentation information may be inserted in a portion of the header, such as an option portion, that does not affect the application of services to the encapsulated packets in the path between tunnel endpoint 108-1 and tunnel endpoint 108-2. For example, the insertion of fragmentation information does not use outer fragmentation as described above and the packets that are sent are not detected as carrying fragments by devices in the path. That is, the devices in the path do not read the fragmentation information that is set in the option portion in the outer header. Rather, tunnel endpoints 108 are configured to insert and process the inserted fragmentation information in the option portion of the header.

On the receive side at host 101-2, encapsulation/decapsulation engine 118-2 may decapsulate the packets by removing the outer header. Fragmentation engine 110-2 may store the fragments with the fragmentation information to allow reassembly of the fragments into the original packet. Once all the fragments are received, fragmentation engine 110-2 can reassemble the original packet by ordering the fragments in the original packet using respective offsets. Tunnel endpoint 108-2 may send the original packet to virtual switch 106-2 for forwarding to compute node 104-2a.

Figure 1B:
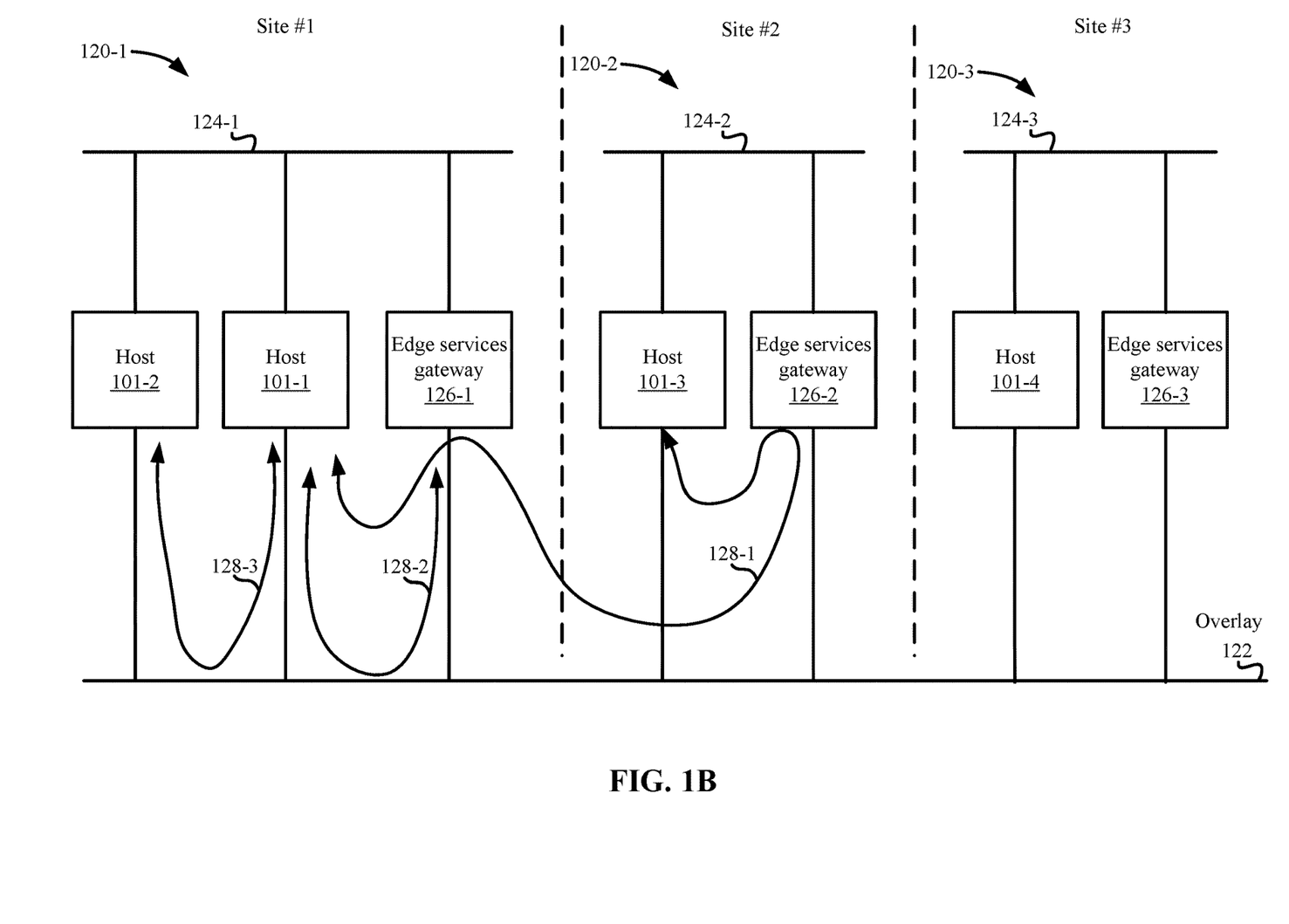
FIG. 1B depicts an example of the system using multiple sites according to some embodiments.

FIG. 1B depicts an example of system 100 using multiple sites 120 according to some embodiments. Sites 120-1, 120-2, and 120-3 (sites #1, #2, and #3) may be deployments in different data centers, such as on premises data centers, cloud provider data centers, etc. Each site 120-1, 120-2, and 120-3 may include a respective local area network 124-1, 124-2, and 124-3. Site 120-1 includes hosts 101-1 and 101-2, site 120-2 includes host 101-3, and site #3 includes host 101-4, but other hosts 101 may be used (not shown). Also, each site 120 includes an edge services gateway (126-1 to 126-3). Edge services gateways 126 are used to communicate data between sites 120. It is noted that hosts 101-1 and 101-2 that are shown in FIG. 1A may be any of hosts 101 and/or edge services gateways 126 shown in FIG. 1B.

Overlay network 122 as illustrated in FIG. 1B may comprise a plurality of separate overlay networks not separately shown. Overlay networks extending between hosts within a particular site may each comprise a set of tunnels extending between the hosts over the physical network underlay (not shown). Each tunnel extends between respective tunnel endpoints 108 as described above with reference to FIG. 1A. Overlay networks between edge services gateways in separate sites may comprise VPN tunnels extending across a common wide area network such as the Internet (not shown).

Tunneled traffic between hosts 101 within a site 120-1 may be generated by encapsulating packets for a flow and sending the encapsulated packets across the physical underlay network (not shown). Also, traffic sent between hosts 101 in different sites 120 may be encapsulated and sent between edge services gateways 126 of respective sites 120, e.g. using a private secure protocol such as IPsec. One path may be from a first host 101-1 in a first site 120-1 to a second host 101-3 in a second site 120-2 via edge services gateways 126-1, 126-2 in each site via a path 128-1. Also, there may be communications between a host 101-1 and edge services gateway 126-1 within a site 120-1 via path 128-2, or between hosts 101-1 and 101-2 via path 128-3.

A tunnel endpoint (not shown) for edge services gateways 126 (e.g., edge services gateways 126-1 and 126-2) may have identified a maximum transmission unit size for tunneled traffic between edge services gateways that is smaller than the encapsulated packet size. When this occurs, the original packet may be fragmented as described herein. Similarly, the original packet may be fragmented as described herein when the encapsulated packet sent between host 101-1 and edge services gateway 126-1 in the same site or between hosts 101 in the same site is larger than the designated maximum transmission size.

The fragmentation process will be described in more detail now.

Fragmentation

Figure 2:
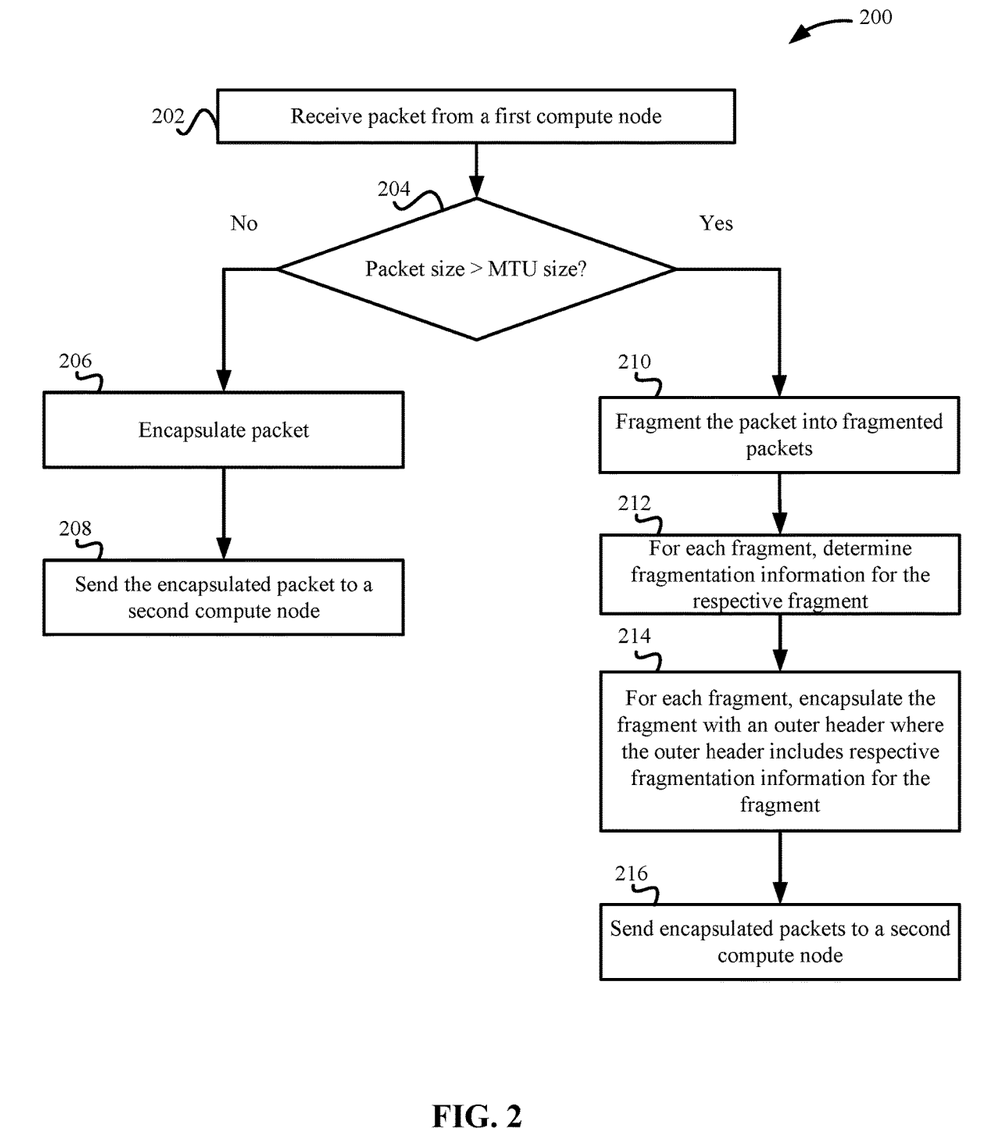
FIG. 2 depicts a simplified flowchart of a method for fragmenting an original packet according to some embodiments.

FIG. 2 depicts a simplified flowchart of a method for fragmenting an original packet according to some embodiments. When a packet is referred to, it is noted the any type of data may be fragmented, such as IP packets, non-IP packets, or other types of data that is transferred between hosts 101. At 202, hypervisor 102-1 receives a packet from first compute node 104-1A. The packet may include a source address (e.g., an address for compute node 104-1A) and destination address (e.g., an address for compute node 104-2A). In this case, the packet should be sent via an overlay tunnel to host 101-2.

At 204, hypervisor 102-1 may determine if the packet size would, once encapsulated, be greater than the maximum transmission unit size supported by the network. In some embodiments, tunnel endpoint 108-1 may analyze the packet length of the original packet and add an expected overhead, i.e., size, of the encapsulation header. If the expected encapsulated packet length is not greater than the maximum transmission unit size, at 206, encapsulation/decapsulation engine 118-1 encapsulates the packet with an outer header. The outer header includes a source address (e.g., an address for tunnel endpoint 108-1), a destination address (e.g., an address for tunnel endpoint 108-2), a source port, and a destination port. Then, at 208, hypervisor 102-1 sends the encapsulated packet to second compute node 104-2A. Accordingly, in the above process, the entire original packet is encapsulated with an outer header and sent via physical network 116 to second compute node 104-2a. No fragmentation is necessary because the original packet meets the designated maximum transmission unit size. As is known, devices in the path use the source address, destination address, source port, and destination port of the outer header to route the packet from host 101-1 to host 101-2.

If the expected encapsulated packet length is greater than the designated maximum transmission unit size, at 210, fragmentation engine 110-1 fragments the packet into fragmented packets. Fragmentation engine 110-1 may determine the length of the fragmented packets in different ways such that the encapsulated packet is not larger than the designated maximum transmission unit size. In some embodiments, fragmentation engine 110-1 determines the fragment size as the designated maximum transmission unit size minus the outer header size.

Figure 3:
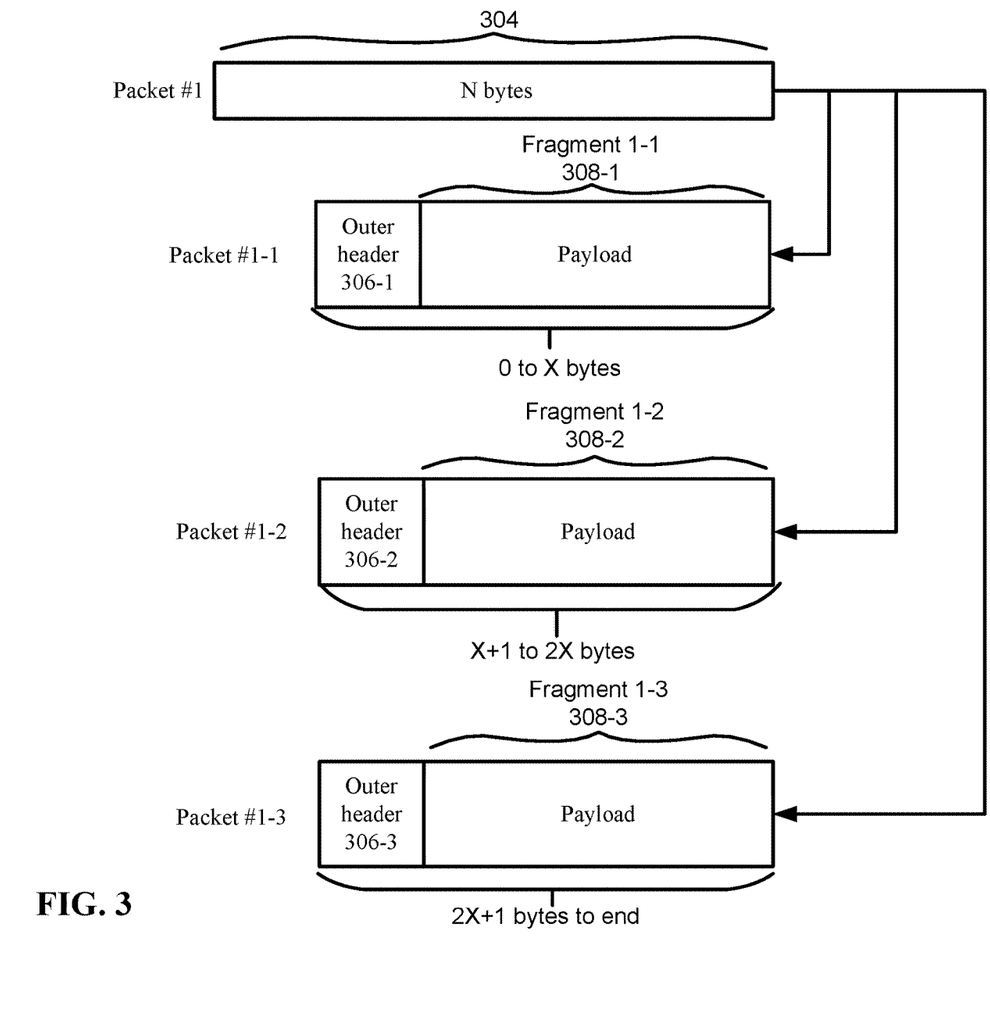
FIG. 3 shows an example of the fragmentation according to some embodiments.

At 210, fragmentation engine 110-1 fragments the original packet into a series of fragmented packets. In some embodiments, the fragmentation may be protocol agnostic. That is, the protocol that is used to send the original packet may be any protocol, such as Internet Protocol or non-Internet Protocol. One reason why the fragmentation may be protocol agnostic is because fragmentation engine 110-1 treats the original packet as payload that is fragmented and inserted into the encapsulated packet. Unlike IP fragmentation that inserts fragmentation information in the inner header, e.g., as described in U.S. Pat. No. 10,630,610, which is incorporated herein by reference in its entirety, fragmentation engine 110-1 inserts fragmentation information into the outer header and does not rely on the inner packet protocol for conveying fragmentation information. FIG. 3 shows an example of the fragmentation according to some embodiments. A packet #1 may be the original packet that is sent by compute node 104-1A. Packet #1 may include inner headers (not shown), but because the packet is treated as payload once it is encapsulated, the packet, including its headers, is shown with a size of N bytes. If Internet Protocol is being used to send the original packet, the inner headers may include a media access control (MAC) header, an IP header, and a user datagram protocol (UDP) (or TCP) header. Although these headers are described, other layer 2, layer 3, and layer 4 headers may be appreciated. Fragmentation engine 110-1 fragments packet #1 into a fragment 1-1 308-1, a fragment 1-2 308-2, and a fragment 1-3 308-3. The fragmentation may be based on a size determined to meet the designated maximum transmission unit size. In this case, the size is represented as X bytes.

Packet #1-1 may include a portion of the N bytes that is shown as payload fragment 308-1. Because fragment 1-1 308-1 is the first fragment, it will include the inner header (not shown) from the original packet #1 as part of its payload. The total size of packet #1-1 is the maximum transmission unit size X. Packet #1-2 includes the next series of bytes from packet #1, which is represented as payload 308-2. Then, packet #1-3 includes the next portion of data from packet #1, which is represented as payload 308-3 to the end of the original packet. Accordingly, fragmentation engine 110 treated packet #1 as payload that is segmented at boundaries based on the MTU size and the outer header 306 size. Although the above fragmentation is described, other methods of fragmentation may be used. For example, other information may be added to the fragments, such as an inner header may be added to each fragment 308. However, in this case, it is noted that fragmentation information for the fragments may not be added to the inner header as the fragmentation information is added in outer header 306. Or, even if fragmentation information is added to the inner header, inserting the fragmentation information in the outer header is still used.

Referring back to FIG. 2, at 212, for each fragment, fragmentation engine 110-1 determines fragmentation information for the respective fragment. The fragmentation information may be metadata that describes the fragmentation and allows reassembly of the original packet at the receive side. The fragmentation information may be different for each fragment, such as the offset is different depending on where the respective fragment is originally found in the original packet.

At 214, for each fragment, encapsulation/decapsulation engine 118-1 encapsulates the fragment with an outer header 306 where outer header 306 includes the respective fragmentation information for the fragment. As discussed above, information in the outer header may be calculated such that services in the path consider the encapsulated packets as part of the same flow. At 216, host 101-1 sends the encapsulated packet to second compute node 104-2A. For example, the source address and destination address of outer header 306 is used to send the encapsulated packet through physical network 116.

Figure 4:
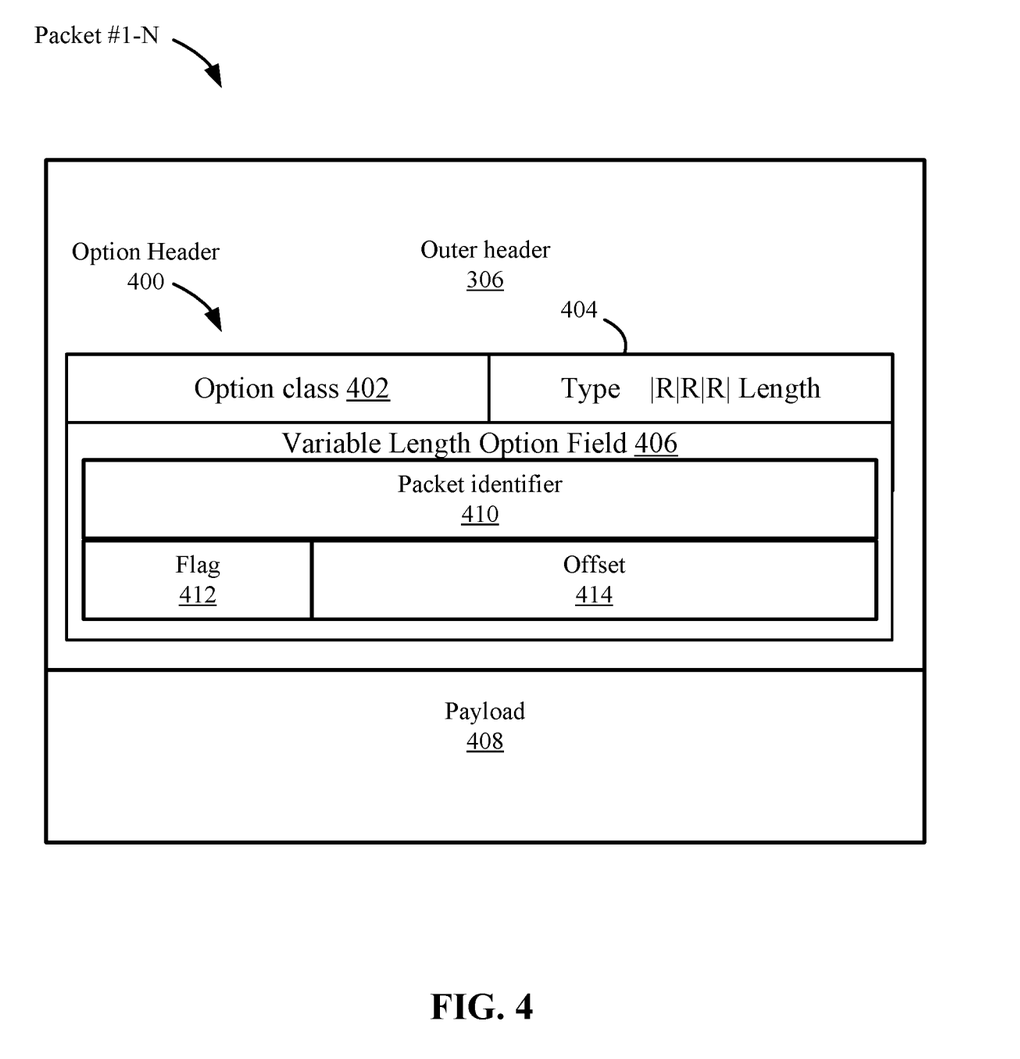
FIG. 4 depicts an example of an encapsulated packet according to some embodiments.

Fragmentation engine 110-1 may insert the fragmentation information in outer header 306 using different methods. For example, fragmentation engine 110-1 may insert the fragmentation information in a designated portion of outer header 306. The fragmentation information may be inserted in each packet, but may be conveyed to the receive side in ways other than in the header. For example, the fragmentation information may be conveyed via a control channel, inserted in packets other than the encapsulated packets that include the fragments, etc. FIG. 4 depicts an example of an encapsulated packet according to some embodiments. Packet #1-N includes an outer header 306 and payload 408. Payload 408 may include a fragment 1-N of the original packet.

As discussed above, the fragmentation information may be inserted in a portion of outer header 306 that is intended to be processed by tunnel endpoints 108, and may not process (e.g., not review, not interpret, ignore, etc.) by devices in the path. For example, a protocol, such as GENEVE, may allow for an option type header to be defined in which fragmentation information may be inserted. The option type header may not be reviewed by devices in the path between tunnel endpoint 108-1 and tunnel endpoint 108-2. By not reviewing the field, the devices may not interpret the encapsulated packets as including fragments.

Different formats of the option type header may be used. In some embodiments, an option header 400 may be 12 bytes in length, but other sizes may be used. Option header 400 may include an option class 402, a type field 404, and a variable-length option data field 406. Option class 402 may be a namespace for type field 404 and may define option header 400 as including fragmentation information. Type field 404 may indicate the format of the data contained in this option. Type field 404 may include option control flags that are reserved which may be three bits, and a length, which may be five bits. The length may be one or more multiples of four bytes. Other formats may also be appreciated.

Variable-length option data field 406 may store the fragmentation information and may be 4 bytes in length, but other sizes may be used. For example, variable-length option data field 406 may include an identifier field 410 that stores a packet identifier that is associated with the original packet. For example, the identifier may be able to identify the fragments are associated with the packet at the destination. The packet identifier may also be determined in different ways. For example, a packet identifier is a packet sequence number that is assigned to a received packet. For example, upon receiving a new packet, host 101 increments the packet identifier that was used for a previously received packet by one, and assigns the incremented identifier to the new packet. The field may be different sizes, such as 32 bits, and the packet identifier may be 16 bits, but the size may vary depending on implementation. Variable-length option data field 406 may also include a flag field 412 to store flags for different information. For example, a flag may be set to indicate that there are more fragments being transmitted or cleared to indicate that the fragment is the last fragment making up the original packet. In one embodiment, the flag field may be 3 bits. One bit may be reserved for information for more fragment, one bit for information for don't fragment, and 1 bit is reserved. An offset field 414 may store information for the offset of the current fragment within the original packet. Offset field 414 may be 29 bits, but other sizes may be used. Other information may be included in variable-length option data field 406. Although the option header in GENEVE is described, it will be understood that other tunneling protocols may be used that may include other options or fields that can be used, and other portions of outer header 306 may be used to insert the fragmentation information.

Receive Side

Figure 5:
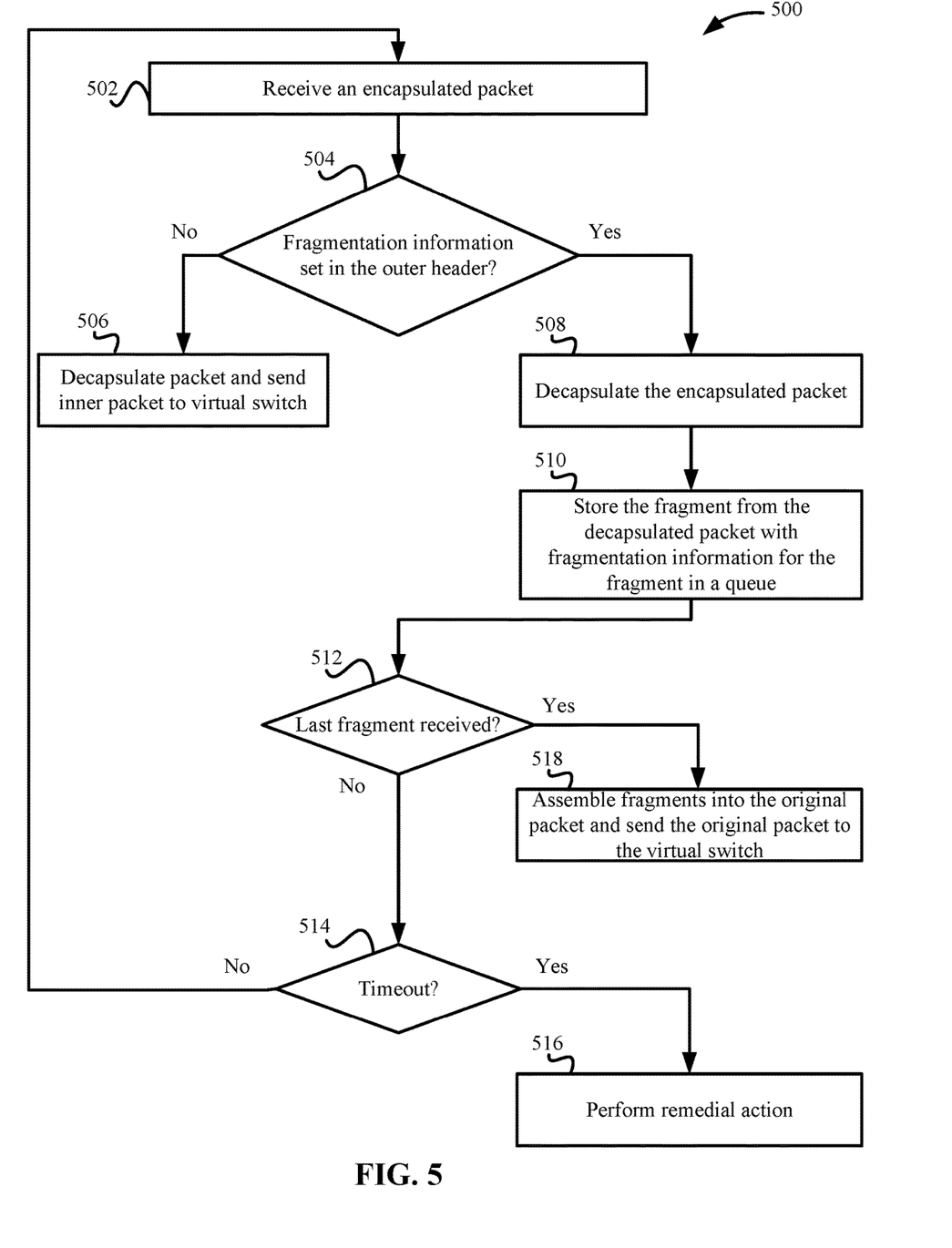
FIG. 5 depicts a simplified flowchart of a method for processing encapsulated packets according to some embodiments.

FIG. 5 depicts a simplified flowchart 500 of a method for processing encapsulated packets according to some embodiments. Host 101-1 sends the encapsulated packets via physical network 116. At 502, host 101-2 receives an encapsulated packet and a PNIC 114-2 may process the encapsulated packets. For example, PNIC 114-2 may use information in outer header 306 to perform receive side scaling. After processing, tunnel endpoint 108-2 receives the encapsulated packet.

At 504, tunnel endpoint 108-2 determines if the encapsulated packet includes a fragmented packet, such as by determining if fragmentation information is set in outer header 306. Tunnel endpoint 108-2 may determine that the inner packet includes a fragmented packet in different ways. For example, tunnel endpoint 108-2 may analyze option header 400 to determine if information, such as a flag (e.g., a flag 412 in variable option data 406), is set that indicates the inner packet includes fragmented data. If it is determined that the encapsulated packet does not include a fragmented packet, such as a flag 412 is not set, at 506, encapsulation/decapsulation engine 118-2 decapsulates the packet and sends the inner packet to virtual switch 106-2. Also, the inclusion of option header 400 with the option class 402 set to a namespace identifier that may define option header 400 as including fragmentation information may be sufficient to determine that the inner packet includes a fragmented packet.

If it is determined that the encapsulated packet does include a fragmented packet, at 508, encapsulation/decapsulation engine 118-2 decapsulates the encapsulated packet. Then, at 510, tunnel endpoint 108-2 stores the fragment from the decapsulated packet with fragmentation information for the fragment. Implementation details for storing the fragment with the fragmentation details are omitted and can be performed in multiple ways, such as in a queue. When storing packets in a queue is discussed, it will be understood that any information may be stored in a queue, such as a reference to the fragment instead of the fragment itself. The fragmentation information may include the packet identifier that identifies packets that belong to the original packet. Also, the fragmentation information may include the offset for the current fragment. The queue is used to store and keep track of the fragments until all of the fragments from the original packet have been received and the fragments can be reassembled into the original packet. It is noted that decapsulated packets are described as being stored, but it will be understood that other methods may be used. For example, the encapsulated packets may be stored in the queue and later when all the encapsulated packets for all the fragments of the original packet are received, all the encapsulated packets may be decapsulated. In this case, the fragmentation information in outer header 306 is stored with the encapsulated packets.

At 512, tunnel endpoint 108-2 determines if the last fragment has been received. For example, tunnel endpoint 108-2 may determine that the last fragment has been received when a flag indicating there are more fragments is not set in outer header 306 and the packet identifier for the original packet matches the fragments that had been stored in the queue. The offsets may be used to determine if all the fragmented packets of the original packet have been received in case some packets are received out of order. For example, an offset range of the original packet may be missing if the last fragment is received out of order and tunnel endpoint 108-2 can wait until that missing fragment is received. If the last fragment has not been received, at 514, tunnel endpoint 108-2 determines if a timeout had been reached. The timeout may be a limit on the amount of time taken to receive all the fragments for the original packet. For example, some fragments may be lost during transmission, and may not be received. If the timeout occurs, at 516, tunnel endpoint 108-2 may perform a remedial action. The remedial action may remove the fragments from the queue, an error may be returned, tunnel endpoint 108-2 may attempt to request a missing fragment, etc. If a timeout does not occur, then the process continues at 502 where another encapsulated packet may be received.

If the last fragment has been received, at 518, tunnel endpoint 108-2 assembles the fragments into the original packet and sends the original packet to virtual switch 106-2. Tunnel endpoint 108-2 may assemble the fragments into the original packet using different methods, such as by using the offset for each respective fragment to reconstruct the original packet. For example, if the original packet is treated as payload and did not have inner headers added to the payload of each encapsulated packet, then tunnel endpoint 108-2 may reassemble the fragments consecutively based on respective offsets. If some inner headers were added, tunnel endpoint 108-2 may remove the inner headers before reassembly into the original packet.

Figure 6:
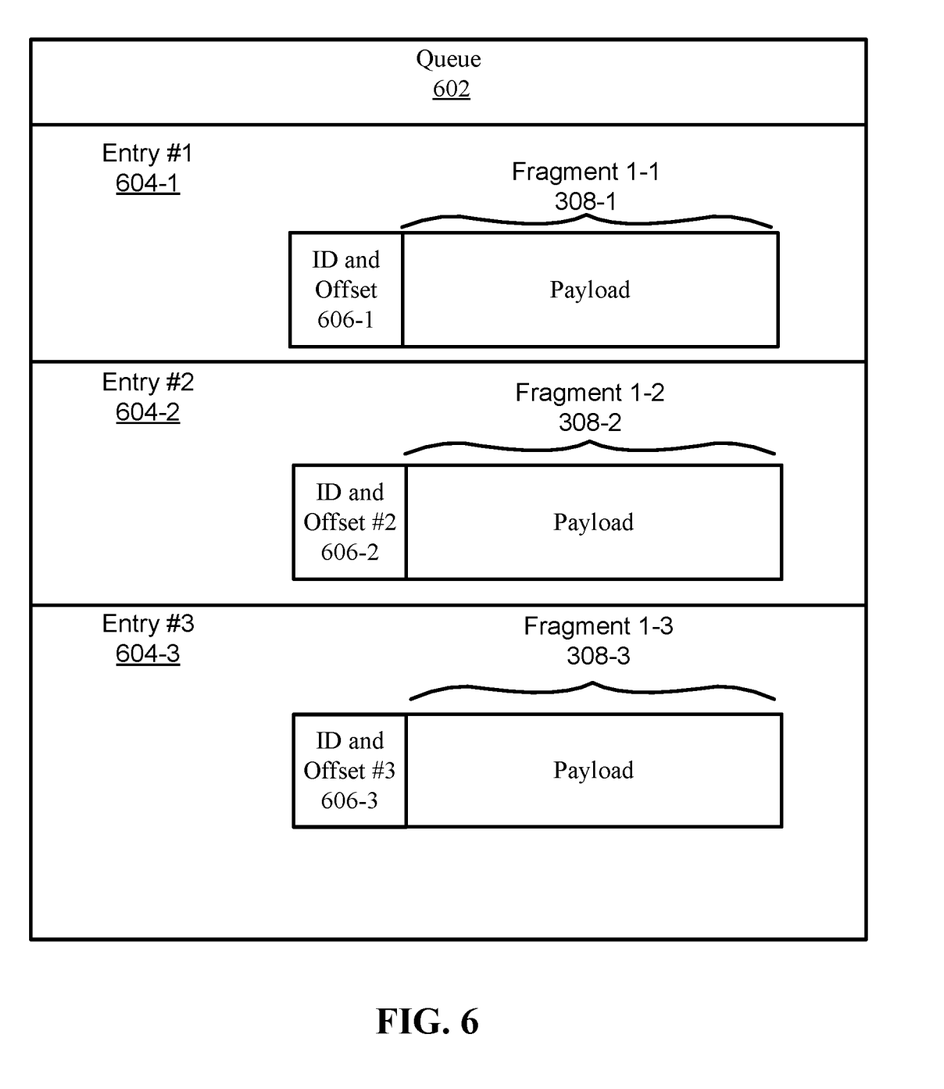
FIG. 6 depicts an example of the reassembly of the original packet according to some embodiments.

FIG. 6 depicts an example of the reassembly of the original packet according to some embodiments. A queue 602 shows entries 604 that store information for fragments. An entry #1 604-1 stores fragment 1-1 308-1, a packet identifier for the original packet, and offset 606-1 for fragment 1-1 308-1. Entry #2 604-2 stores fragment 1-2 308-2, the packet identifier for the original packet, and offset #2 606-2 for fragment 1-2 308-2. Entry #3 604-3 stores fragment 1-3 308-3, the packet identifier for the original packet, and offset #3 606-3 for fragment 1-3 308-3. In some embodiments, the inner header of the original packet is only sent once in fragment 1-1 308-1. The reassembly of the original packet includes the original header of the original packet. Tunnel endpoint 108 may retrieve all of the fragments 308 that have the same packet identifier in entries 604-1, 604-2, and 604-3, and then reassemble the original packet based on respective offsets.

Conclusion

Accordingly, by inserting fragmentation information in outer header 306, the inner fragmentation may be protocol agnostic. Additionally, the fragmentation information is inserted such that services that perform on the encapsulated packet may still associate the encapsulated fragments as being part of the same flow. Also, some services in the path do not drop the packets because the services do not consider the packets as including fragments.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. Various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method comprising:
fragmenting a first packet into a plurality of fragments when a length of an encapsulated first packet is larger than a maximum transmission unit size;
for each fragment in the plurality of fragments, generating fragmentation information;
encapsulating each fragment in the plurality of fragments with an outer header to form a plurality of encapsulated packets, wherein respective fragmentation information for each fragment is inserted in a particular portion of the outer header not read by devices along a path of an overlay tunnel, wherein the particular portion of the outer header forms at least part of an option portion of the outer header, the particular portion being processed by endpoints of an overlay tunnel and not a device along a path of the overlay tunnel causing the first packet to not be identified by the device along the path of the overlay tunnel as carrying fragments; and
sending the plurality of encapsulated packets via the overlay tunnel.

2. The method of claim 1, wherein the device along the path of the overlay tunnel processes the outer header and not the particular portion of the outer header.

3. The method of claim 1, wherein fragmenting the first packet is implemented by an operating system's network stack.

4. The method of claim 1, wherein:
the fragmentation information is added to a field of the outer header that is defined for an endpoint to store information to indicate the encapsulated packet includes a fragment of the first packet, and
the device does not process the field.

5. The method of claim 1, wherein the fragmentation information includes first information to identify each fragment is associated with the first packet and second information that allows the fragments to be reassembled into the first packet.

6. The method of claim 1, wherein a hypervisor fragments the first packet without using an overlay network.

7. the endpoints do not review the particular portion and do not identify the plurality of fragmented packets as carrying fragments of the first packet.

8. A non-transitory computer-readable storage medium containing instructions, that when executed, control a computer system to be operable for:
fragmenting a first packet into a plurality of fragments when a length of an encapsulated first packet is larger than a maximum transmission unit size;
for each fragment in the plurality of fragments, generating fragmentation information;
encapsulating each fragment in the plurality of fragments with an outer header to form a plurality of encapsulated packets, wherein respective fragmentation information for each fragment is inserted in a particular portion of the outer header not read by devices along a path of an overlay tunnel, wherein the particular portion of the outer header forms at least part of an option portion of the outer header, the particular portion being processed by endpoints of an overlay tunnel and not a device along a path of the overlay tunnel causing the device along the path of the overlay tunnel to not determine the first packet includes fragments; and
sending the plurality of encapsulated packets via the overlay tunnel.

9. The non-transitory computer-readable storage medium of claim 8, wherein:
the first packet is fragmented at a determined size to form each fragment, and
an inner header is not included in each of the plurality of encapsulated packets.

10. The non-transitory computer-readable storage medium of claim 8, wherein a header of the first packet is included once in the plurality of encapsulated packets.

11. The non-transitory computer-readable storage medium of claim 8, wherein:
the fragmentation information is added to a field of the outer header that is defined for an endpoint to store information to indicate the encapsulated packet includes a fragment of the first packet, and
the device does not process the field.

12. The non-transitory computer-readable storage medium of claim 8, wherein the fragmentation information includes first information to identify each fragment is associated with the first packet and second information that allows the fragments to be reassembled into the first packet.

13. The non-transitory computer-readable storage medium of claim 8, wherein the maximum transmission unit size is based on a first maximum transmission unit size in the path in which the packet will be sent or a second maximum transmission unit size of the endpoint.

14. The non-transitory computer-readable storage medium of claim 8, wherein:
the fragments in the plurality of encapsulated packets are stored until all the fragments are received, and reassembled using the fragmentation information.

15. A method comprising:
receiving a plurality of encapsulated packets that each include a fragment of a first packet, wherein the first packet is fragmented into fragments when a length of an encapsulated first packet is larger than a maximum transmission unit size;
retrieving fragmentation information for each fragment from a particular portion of an outer header of the plurality of encapsulated packets, wherein the particular portion of the outer header forms at least part of an option portion of the outer header, wherein the particular portion of the outer header is selected to include the fragmentation information as the particular portion is processed by an endpoint of an overlay tunnel and not processed by a device along a path of the overlay tunnel causing the device along the path of the overlay tunnel to not identify the first packet as including the fragmentation information;
storing the fragments and the respective fragmentation information; and
reassembling the first packet using the fragments and the respective fragmentation information.

16. The method of claim 15, wherein no device between the endpoints interpret the encapsulated packets as including fragments.

17. The method of claim 15, wherein:
the fragmentation information is retrieved from an optional field of the outer header that is defined for an endpoint to store information to indicate the encapsulated packet includes a fragment of the first packet, and
the device does not process the optional field.

18. The method of claim 15, wherein reassembling the packet comprises:
reassembling the fragments based on respective offset information for the fragments, wherein the offset information indicates a position in the first packet for the fragment.

19. The method of claim 15, wherein a header of the first packet is included once in the plurality of encapsulated packets.

20. The method of claim 15, further comprising:
decapsulating each of the plurality of encapsulated packets to retrieve the fragments.

21. The method of claim 15, further comprising:
sending the first packet after reassembling the packet to a destination.

* * * * *